(12) United States Patent
Alvise Cognolato et al.

(10) Patent No.: US 12,196,267 B2
(45) Date of Patent: Jan. 14, 2025

(54) SWIVEL BEARING UNIT

(71) Applicant: AKTIEBOLAGET SKF, Gotenborg (SE)

(72) Inventors: Gianni Alvise Cognolato, Moncalieri (IT); Pietro Fabio Picatto, Turin (IT)

(73) Assignee: AKTIEBOLAGET SKF (SE)

( * ) Notice: Subject to any disclaimer, the term of this patent is extended or adjusted under 35 U.S.C. 154(b) by 209 days.

(21) Appl. No.: 17/934,217

(22) Filed: Sep. 22, 2022

(65) Prior Publication Data

US 2023/0101003 A1    Mar. 30, 2023

(30) Foreign Application Priority Data

Sep. 30, 2021    (IT) .......... 102021000024992

(51) Int. Cl.
*F16C 33/78*    (2006.01)
*F16C 19/38*    (2006.01)
*F16C 23/08*    (2006.01)

(52) U.S. Cl.
CPC .......... *F16C 33/7806* (2013.01); *F16C 19/38* (2013.01); *F16C 23/086* (2013.01); *F16C 33/7823* (2013.01); *F16C 33/7886* (2013.01)

(58) Field of Classification Search
CPC ...... F16C 19/38; F16C 23/084; F16C 23/086; F16C 33/7806; F16C 33/7823; F16C 33/7876; F16C 33/7886; F16C 33/7867
See application file for complete search history.

(56) References Cited

U.S. PATENT DOCUMENTS

| | | |
|---|---|---|
| 4,249,782 A | 2/1981 | Frank |
| 4,755,067 A | 7/1988 | Asberg et al. |
| 2003/0063824 A1 | 4/2003 | Aldridge |
| 2011/0069917 A1 | 3/2011 | Yamada et al. |
| 2012/0126489 A1 | 5/2012 | Picatto et al. |
| 2015/0323012 A1 | 11/2015 | Cross et al. |

(Continued)

FOREIGN PATENT DOCUMENTS

| | | |
|---|---|---|
| CN | 105465186 | 4/2016 |
| CN | 212106631 | 12/2020 |

(Continued)

OTHER PUBLICATIONS

Machine Translation of RU 2153106 (Year: 2000).*

(Continued)

*Primary Examiner* — Alan B Waits
(74) *Attorney, Agent, or Firm* — Reed Smith LLP

(57) ABSTRACT

A swivel bearing unit may have a stationary radially outer ring and a rotatable radially inner ring. The swivel bearing unit may further have a double row of rolling members interposed between the radially outer ring and the radially inner ring, a casing, inside which the rings of the bearing unit are housed, and a sealing device. The sealing device may include an elastomer seal co-molded onto a shaped metal screen stably anchored to the housing. The elastomer seal may be provided with a first radial lip and with a second axially external radial lip. Both the first radial lip and the second radial lip make sliding contact by respective contacting edges with a radially external surface of the radially inner ring. The first radial lip may have a thickness (SP1) greater than a thickness (SP2) of the second radial lip.

17 Claims, 3 Drawing Sheets

(56) References Cited

U.S. PATENT DOCUMENTS

| | | | | |
|---|---|---|---|---|
| 2017/0122435 A1 | * | 5/2017 | Molina | B60C 23/00318 |
| 2018/0073556 A1 | | 3/2018 | Wendt et al. | |
| 2018/0306250 A1 | * | 10/2018 | Breun | F16C 19/36 |
| 2021/0172474 A1 | | 6/2021 | Nakanishi et al. | |

FOREIGN PATENT DOCUMENTS

| | | | | |
|---|---|---|---|---|
| DE | 102014216526 | | 2/2016 | |
| DE | 102016220390 | | 4/2018 | |
| DE | 102019110183 | | 10/2020 | |
| DE | 102019110445 | | 10/2020 | |
| EP | 2927523 | | 10/2015 | |
| JP | 11218141 | | 8/1999 | |
| JP | 2008249034 A | * | 10/2008 | F16C 33/7806 |
| JP | 2009103172 A | * | 5/2009 | F16C 33/7806 |
| JP | 2014001811 A | * | 1/2014 | F16C 33/7806 |
| JP | 2020106132 | | 7/2020 | |
| RU | 2153106 C1 | * | 7/2000 | F16C 23/086 |

OTHER PUBLICATIONS

Machine Translation of JP 2008249034 (Year: 2008).*
Machine Translation of JP 2009103172 (Year: 2009).*
Machine Translation of JP 2014001811 (Year: 2014).*
Search Report of corresponding Swedish Patent Application No. 2251098-6 dated May 15, 2023.
Search Report for corresponding Italy Patent Application No. 102021000024992 dated Apr. 26, 2022.

* cited by examiner

SWIVEL BEARING UNIT

CROSS-REFERENCE TO RELATED APPLICATIONS

This application is based on and claims priority to Italian Patent Application No. 102021000024992 filed on Sep. 30, 2021, under 35 U.S.C. § 119, the disclosure of which is incorporated by reference herein.

FIELD

The present disclosure relates to a swivel bearing unit provided with a sealing device configured to ensure sealing in conditions where the rings of the bearing unit are not perfectly parallel with each other.

BACKGROUND

In general, the bearing unit has a first component, for example a radially outer ring, which is fixed to a stationary element—generally a containment casing—and a second component, for example a radially inner ring, which is fixed to a rotating element, normally a rotating shaft. In other applications it could happen that the radially inner ring is stationary, while the radially outer ring is rotatable. In any case, in the rolling bearing units, the rotation of one ring with respect to the other ring is allowed by a plurality of rolling bodies, which are positioned between the cylindrical surface of one component and the cylindrical surface of the second component, normally called raceways. The rolling bodies may be balls, cylindrical or tapered rollers, needle rollers and similar rolling bodies.

It is known that the bearing units have sealing devices for protecting the raceways and rolling bodies against the external contaminants and for providing a seal with regard to the lubricating grease. Typically, the sealing devices consist of an elastomer seal co-molded onto a shaped metal screen and mounted by means of interference inside a seat of the rings of the bearing unt or of the containment casing. The seal is provided with a contacting sealing lip, which, by means of a sliding contact with the rotating ring of the bearing unit, performs its sealing function.

BRIEF DESCRIPTION OF THE DRAWINGS

The disclosure will now be described with reference to the accompanying drawings, which illustrate a non-limiting exemplary embodiments thereof, in which.

DETAILED DESCRIPTION

Figure 1:
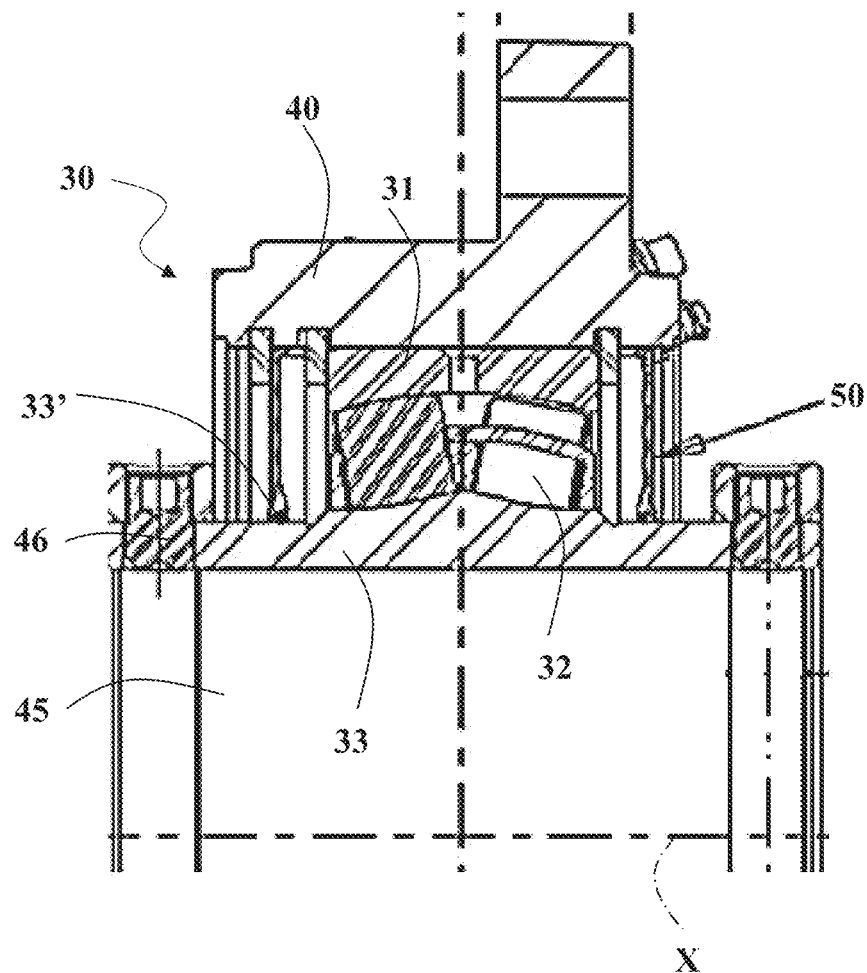
FIG. 1 is a cross-sectional view of an exemplary embodiment of the swivel bearing unit in accordance with this disclosure.

Some bearing units such as "spherical rolling bearings" (SRB) may include swivel bearing units. During its rotation, the shaft and consequently the radially inner ring are subject to an angular misalignment in the axial direction with respect to the radially outer stationary ring. In general, the specifications of these bearing units may allow for an angular misalignment of up to ±2°. In these applications, normally, the sealing device is mounted on the casing and the contacting lip works by sliding contact on the radially inner ring. A positive angular misalignment is defined as being an angular misalignment which tends to move the surfaces of the components between which the sealing device (for example casing and inner ring) operates towards each other and a negative angular misalignment is defined as being one which tends to move the same surfaces away from each other.

A problem is the angular misalignment between the rings of the bearing unit, which known sealing devices are unable to follow, the misalignment being in addition to the geometric tolerances of the components involved, for example, casing, inner ring, shaft. The angular misalignment of the inner ring may influence the contact of the sealing lip, causing, if negative, namely when it tends to move the surface of the radially inner ring away, a reduction in the contact force of the lip or, in the worst case, the loss of the contact, thus allowing the entry of contaminants inside the bearing unit. In the opposite case, when the surface of the inner ring moves closer as a result of the angular misalignment (positive misalignment), the compressive stresses acting on the contact lip may become no longer tolerable.

The solutions proposed hitherto, using different sealing configurations, have not provided to be satisfactory and in any case have been unable to provide sealing lips which are sufficiently long and flexible so as to follow, without causing problems, the angular misalignment of the radially inner ring.

A swivel bearing unit provided with a sealing device according to various embodiments of this disclosure overcomes the aforementioned drawbacks.

An object of the present disclosure is to provide a swivel bearing unit provided with a sealing device provided with two contacting radial lips, wherein the two radial lips, which are radially internal with respect to the sealing device, are configured with a geometric form having a length and flexibility suitable for ensuring the correct contact of the lips with the radially inner ring of the swivel bearing unit in all conditions of interference associated with the geometric tolerances of the components, including the angular misalignment of the radially inner ring.

The shape adopted for the contacting radial lips may reduce to a minimum the stress/deformation distribution over the geometry of the lips when the surface of the inner ring moves closer as a result of the angular misalignment, and may provide a small variation in the contact force of the lips within the whole interference range, even when the angular misalignment tends to move the surface of the radially inner ring away.

Figure 2:
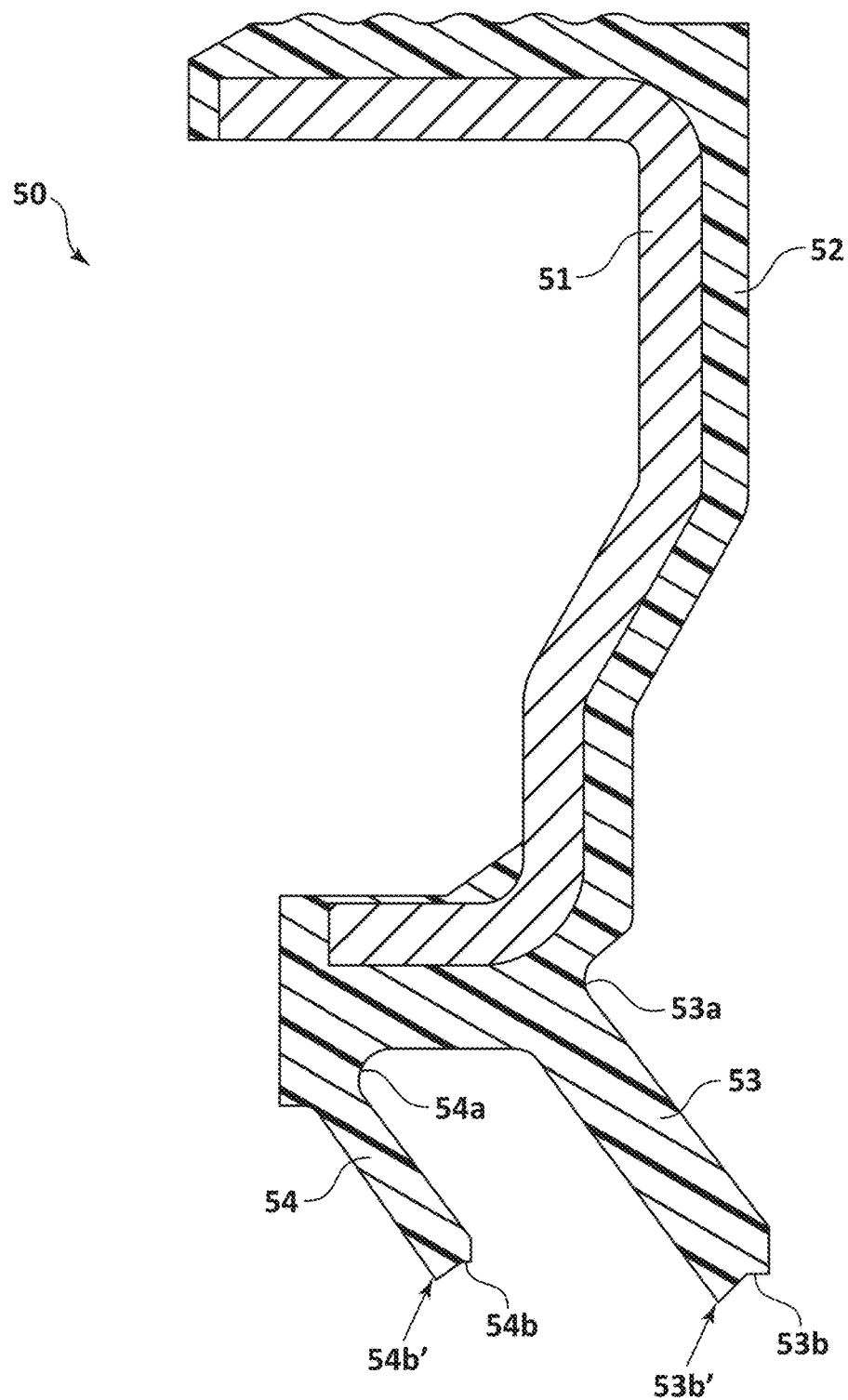
FIG. 2 is a radially sectioned view of the sealing device associated with the swivel bearing unit according to FIG. 1.
Figure 3:
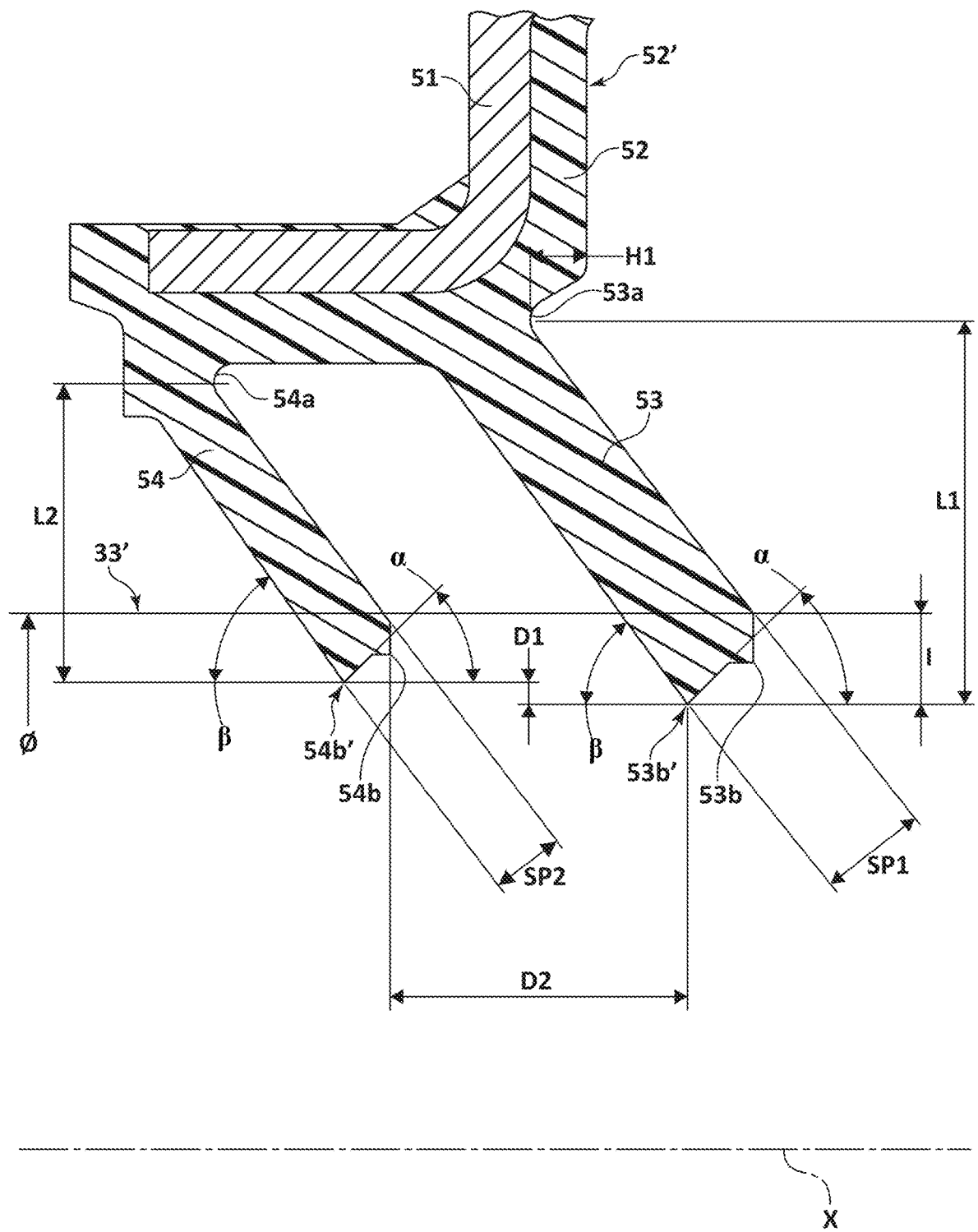
FIG. 3 is an enlarged detail view of the sealing device according to FIG. 2.

With reference to FIGS. 1-3, a swivel bearing unit 30 may include a radially outer ring 31, which may be stationary; a radially inner ring 33, which may be rotatable about a central rotation axis X of the bearing unit 30 and integral with a rotating shaft 45, for example by a threaded fixing element 46. The bearing unit 30 may further include a double row of rolling bodies 32, in this example tapered rollers, interposed between the radially outer ring 31 and the radially inner ring 33 so as to allow relative rotation thereof; and a casing 40, inside which the bearing unit 30 is housed.

In the present description and in the claims, the terms and expressions indicating positions and orientations, such as "radial" and "axial" are understood as being in relation to the axis of rotation X of the bearing unit 30.

For simplicity of illustration, the reference number 32 will be attributed both to the single rolling bodies and to the row of rolling bodies. Again for simplicity, the term "tapered roller" may be used by way of example in the present description and in the attached drawings instead of the more generic term "rolling body" and likewise the same reference numbers will also be used. One of ordinary skill may envisage the use of rolling bodies other than tapered rollers without thereby departing from the scope of the present disclosure.

With reference also to FIG. 2, the swivel bearing unit 30 may also be provided with a sealing device 50 which may include an elastomer seal 52 co-molded onto a shaped metal screen 51. Shaped metal screen 51 may be mounted by interference inside a seat of the containment casing 40 and stably anchored to the casing 40. The elastomer seal 52 may be provided with a first radial lip 53, which may be radially internal and contacting, and with a second radial lip 54, which may also be radially internal and contacting and axially more external than the first radial lip 53 in relation to the double row of rolling bodies 32. Each radial lip 53, 54 may include a joining edge 53a, 54a joined to the elastomer seal 52 and a contacting edge 53b, 54b. Each contacting edge may be provided with a radially inner end and an axially outer end 53b', 54b'.

The two radial lips 53, 54 may be configured to perform a sealing function by sliding contact of the respective contacting edge with a radially outer surface 33' of the radially inner ring 33. The first radial lip 53 may have a thickness SP1 greater than the thickness SP2 of the second radial lip 54 and may be configured to ensure the sealing action, while the second radial lip 54 may be further configured for maintaining the sealing action.

As already mentioned, a problem occurs when there is an angular misalignment of ±2°. In various embodiments, a geometrical form of the lips may be configured to follow this angular variation.

In other words, the sealing device 50, compared to the known solutions, may be configured with longer and more flexible lips. Furthermore, the flat surface of the lips, during the maximum deformation of the said lips, may be smaller. Finally, the lips may be configured so as to never lose contact even in conditions where there is minimum interference, for example, the surface of the inner ring moves away owing to angular misalignment.

In various embodiments, the contacting lips 53, 54 and the entire elastomer seal 52 may be formed from an elastomer material having low friction and a high modulus of elasticity, suitable for ensuring the necessary flexibility and low losses due to friction in the necessary operating conditions. For example, an elastomer of the type HNBR (Hydrogenated Nitrile Butadiene Rubber) may be a high-elasticity synthetic elastomer suitable for the construction of flexible components, for example, pipes or flexible connections.

With reference to FIG. 3, in addition to the material, some geometric characteristics of the radial lips may help ensure that the predefined objects are achieved.

In various embodiments, the length of the radial lips and, in particular, the radial component L1 of the length of the first radial lip 53 and the radial component L2 of the length of the second radial lip 54 are configured to ensure sealing action and flexibility of the radial lips. For each lip, the radial components may be defined as the distance in the radial direction respectively from the joining edge 53a, 54a to the radially internal and axially external end 53b', 54b' of the contacting edge 53b, 54b. The lengths, namely the radial components L1, L2, are dimensions which may improve both the sealing action and the flexibility of the corresponding radial lips. The increase in the displacement of the shaft 45 and therefore of the radially inner ring 33, due to the angle of misalignment and the axial position of the seal, requires greater interference. Therefore, in order to compensate for the increase in interference the first radial lip 53 and the second radial lip 54 may be longer and more flexible. Moreover, the lengths of the radial lips allow excellent control also of the contact forces and the consequent contact pressures. The radial components L1, L2 are a function of the diameter $\phi$ of the contact surface 33' of the radially inner ring 33 and of the angular misalignment of the radially outer ring 33 with respect to the casing 40 in the direction of the rotation axis X. In other words, these radial components L1, L2 depend on the specific application since they may ensure the necessary length of the lip. In order to ensure a suitable flexibility these radial components may also be related to the respective thicknesses SP1, SP2 of the radial lips 53, 54. Advantageously, as regards the first radial lip 53, the ratio SP1:L1 for ensuring a suitable flexibility may be between about 0.2 and 0.35. For higher values, the radial lip 53 may become too rigid, while for lower values the radial lip 53 may become too flexible and therefore is unable to ensure a sufficient contact pressure.

Considering still the first radial lip 53, the most important of the two lips for the purposes of the sealing action, the interference I is defined by the radial distance between the radially outer surface 33' of the radially inner ring 33 and the end 53b' of the contacting edge 53b. Advantageously, the ratio I:L1 may be between about 0.24 and 0.36. In the case of higher values, the stresses on the lip associated with a high contact pressure can no longer be supported, while in the case of lower values it is not possible to generate sufficient contact pressure.

The axial distance H1 between the joining edge 53a of the first radial lip 53 and an axially internal wall 52' of the elastomer seal 52 determines the rigidity of the hinge-like constraint between lip and elastomer seal. The size thereof, which may be between about 0.2 mm and about 3 mm, may have the function of reducing the contact forces, by reducing the area of the "hinge".

The angles of the radial lips, which may be identical to each other, are also important. The angle which each radial lip 53, 54 forms with the direction of the rotation axis X is indicated by □ and the angle which each contacting edge 53b, 54b of the respective radial lips 53, 54 forms, again with the direction of the rotation axis X, is indicated by □.

The angle □ is directed towards the inside of the bearing unit and may ensure sealing with respect to the grease present inside the bearing unit. This angle may enable a good contact pressure to be obtained, with a reduction in the contact surface area also in conditions with greater interference. The angle □ may be between about 45° and about 75°.

The angle □ is directed towards the outside of the bearing unit and may ensure sealing with respect to the contaminant from the external environment. The angle □ may be between about 35° and about 65°.

Another geometric parameter to be considered is the minimum distance D2 in the direction of the rotation axis X between the first radial lip 53 and the second radial lip 54. It represents the space necessary in order to obtain a good arrangement of the lips in conditions of maximum interference. It is also an important parameter for the production process since it allows the extraction of the sealing device from the mold. The value of D2 may be kept as small as possible because it determines the axial volume of the sealing device. However, in order to guarantee the conditions described above, the value of the minimum distance D2 between the lips may not be less than the value of the radial component L2 of the length of the second radial lip 54.

Finally, the distance in the radial direction D1 between the end 53b' of the contacting edge 53b of the first radial lip 53 and the end 54b' of the contacting edge 54b of the second radial lip 54 is a distance which may be necessary for obtaining a correct position of the second radial lip 54, reducing the flat surface thereof in conditions of maximum interference. A value of the distance D1 between about 0.1 mm and 1.6 mm may ensure that there is interference with the external lip.

To summarize, various embodiments of the sealing device according to this disclosure, owing to the geometry of the contacting lips which have a sufficient length and flexibility, may offer advantages.

In various embodiments, the sealing device may ensure contact of the lips with the radially inner ring in all interference conditions due to the geometric tolerances of the components, including the angular misalignment of the said ring.

In various embodiments, the sealing device may reduce the stresses and deformations distributed over the lips in conditions of maximum interference of the lips.

In various embodiments, the sealing device may reduce the variation in the contact forces of the lips within the whole interference range.

In various embodiments, the sealing device may reduce the contact surface area of the lips with the contact surface area of the radially inner ring, thus resulting in a high contact pressure of the lips in all operating conditions.

In addition to the embodiments of the disclosure, as described above, it is to be understood that numerous further variants exist. It must also be understood that said embodiments are only examples and do not limit either the scope of the disclosure, nor its applications, nor its possible configurations. On the contrary, although the description provided above enables the person skilled in the art to implement the present disclosure at least in one of its examples of configuration, it must be understood that numerous variations of the components described are feasible, without thereby departing from the scope of the disclosure, as defined in the accompanying claims, interpreted literally and/or in accordance with their legal equivalents.

What is claimed is:

1. A swivel bearing unit, comprising:
a radially outer ring configured to be stationary during use of the swivel bearing unit;
a radially inner ring configured to rotate during use of the swivel bearing unit, with respect to a rotation axis (X), the radially inner ring configured to be fixed to a rotating shaft for rotation therewith;
a double row of rolling bodies interposed between the radially outer ring and the radially inner ring;
a casing for housing the radially outer ring and the radially inner ring;
a sealing device, comprising an elastomer seal co-molded onto a shaped metal screen fixed to the casing;
wherein:
the elastomer seal comprises a first radial lip, which extends in a radially inward direction from a joining edge of the first radial lip joined to the elastomer seal, and with a second radial lip, which also extends in a radially inward direction from a joining edge of the second radial lip joined to the elastomer seal and axially more external than the first radial lip in relation to the double row of rolling bodies;
the first radial lip and the second radial lip each comprise a contacting edge configured to make sliding contact with a cylindrical contacting surface of the radially inner ring; and
the first radial lip comprises a thickness (SP1) greater than a thickness (SP2) of the second radial lip.

2. The swivel bearing unit of claim 1, wherein the elastomer seal and the radial lips comprise hydrogenated nitrile butadiene rubber.

3. The swivel bearing unit of claim 1, wherein the elastomer seal and the radial lips comprise hydrogenated acrylonitrile butadiene.

4. The swivel bearing unit of claim 3, wherein a radial component (L1) of a length of the first radial lip comprises a radial distance between the joining edge of the first radial lip joined to the elastomer seal and a radially inner and axially outer end of the contacting edge, and a radial component (L2) of a length of the second radial lip comprises a radial distance between the joining edge of the second radial lip joined to the elastomer seal and a radially inner and axially outer end of the contacting edge; and
the radial component (L1) of the length of the first radial lip and the radial component (L2) of the length of the second radial lip are a function of a diameter (+) of a radially outer surface of the radially inner ring and an angular misalignment in the direction of the rotation axis (X between the casing and the radially inner ring.

5. The swivel bearing unit of claim 4, wherein a ratio between the thickness (SP1) of the first radial lip and the radial component (L1) of the length of the first radial lip is between about 0.2 and about 0.35.

6. The swivel bearing unit of claim 5, wherein an interference (I) of the first radial lip comprises a radial distance between the radially outer surface of the radially inner ring and the axially outer end of the contacting edge; and
a ratio between the interference (I) of the first radial lip and the radial component (L1) of the length of the first radial lip is between about 0.24 and about 0.36.

7. The swivel bearing unit of claim 6, wherein an axial distance (H1) between the joining edge of the first radial lip and an axially inner wall of the elastomer seal is between about 0.2 mm and about 3 mm.

8. The swivel bearing unit of claim 7, wherein a first angle (β) that each radial lip forms with the direction of the rotation axis (X) is between about 45° and about 75° and a second angle (α) that each contacting edge of the corresponding radial lips forms with the direction of the rotation axis (X) is between about 35° and about 65°.

9. The swivel bearing unit of claim 8, wherein a minimum distance (D2) in the direction of the rotation axis (X) between the first radial lip and the second radial lip is not less than the value of the radial component (L2) of the length of the second radial lip.

10. The swivel bearing unit of claim 9, wherein a radial distance (D1) between the axially outer end of the contacting edge of the first radial lip and the axially outer end of the contacting edge of the second radial lip is between about 0.1 mm and about 1.6 mm.

11. The swivel bearing unit of claim 1, wherein a radial component (L1) of a length of the first radial lip comprises a radial distance between the joining edge of the first radial lip joined to the elastomer seal and a radially inner and axially outer end of the contacting edge, and a radial component (L2) of a length of the second radial lip comprises a radial distance between the joining edge of the second radial lip joined to the elastomer seal and a radially inner and axially outer end of the contacting edge; and
the radial component (L1) of the length of the first radial lip and the radial component (L2) of the length of the second radial lip are a function of a diameter (ϕ) of a radially outer surface of the radially inner ring and an angular misalignment in the direction of the rotation axis (X) between the casing and the radially inner ring.

12. The swivel bearing unit of claim 11, wherein a ratio between the thickness (SP1) of the first radial lip and the radial component (L1) of the length of the first radial lip is between about 0.2 and about 0.35.

13. The swivel bearing unit of claim 11, wherein an interference (I) of the first radial lip comprises a radial distance between the radially outer surface of the radially inner ring and the axially outer end of the contacting edge; and
   a ratio between the interference (I) of the first radial lip and the radial component (L1) of the length of the first radial lip is between about 0.24 and about 0.36.

14. The swivel bearing unit of claim 11, wherein a minimum distance (D2) in the direction of the rotation axis (X) between the radially internal and axially external end of the contacting edge of the first radial lip and a radially internal and axially internal end of the contacting edge of the second radial lip is not less than the value of the radial component (L2) of the length of the second radial lip.

15. The swivel bearing unit of claim 11, wherein a radial distance (D1) between the axially outer end of the contacting edge of the first radial lip and the axially outer end of the contacting edge of the second radial lip is between about 0.1 mm and about 1.6 mm.

16. A swivel bearing unit, comprising:
a radially outer ring configured to be stationary during use of the swivel bearing unit;
a radially inner ring configured to rotate during use of the swivel bearing unit, with respect to a rotation axis (X), the radially inner ring configured to be fixed to a rotating shaft for rotation therewith;
a double row of rolling bodies interposed between the radially outer ring and the radially inner ring;
a casing for housing the radially outer ring and the radially inner ring;
a sealing device, comprising an elastomer seal co-molded onto a shaped metal screen fixed to the casing;
wherein:
the elastomer seal comprises a first radial lip, which extends in a radially internal inward direction from a joining edge of the first radial lip joined to the elastomer seal, and with a second radial lip, which also extends in a radially internal inward direction from a joining edge of the second radial lip joined to the elastomer seal and axially more external than the first radial lip in relation to the double row of rolling bodies;
the first radial lip and the second radial lip each comprise a contacting edge configured to make sliding contact with a radially external surface of the radially inner ring; and
the first radial lip comprises a thickness (SP1) greater than a thickness (SP2) of the second radial lip;
wherein a radial component (L1) of a length of the first radial lip comprises a radial distance between a joining edge of the first radial lip joined to the elastomer seal and a radially inner and axially outer end of the contacting edge, and a radial component (L2) of a length of the second radial lip comprises a radial distance between a joining edge of the second radial lip joined to the elastomer seal and a radially inner and axially outer end of the contacting edge; and
the radial component (L1) of the length of the first radial lip and the radial component (L2) of the length of the second radial lip are a function of a diameter (ϕ) of a radially outer surface of the radially inner ring and an angular misalignment in the direction of the rotation axis (X) between the casing and the radially inner ring;
wherein an axial distance (H1) between the joining edge of the first radial lip and an axially inner wall of the elastomer seal is between about 0.2 mm and about 3 mm.

17. A swivel bearing unit, comprising:
a radially outer ring configured to be stationary during use of the swivel bearing unit;
a radially inner ring configured to rotate during use of the swivel bearing unit, with respect to a rotation axis (X), the radially inner ring configured to be fixed to a rotating shaft for rotation therewith;
a double row of rolling bodies interposed between the radially outer ring and the radially inner ring;
a casing for housing the radially outer ring and the radially inner ring;
a sealing device, comprising an elastomer seal co-molded onto a shaped metal screen fixed to the casing;
wherein:
the elastomer seal comprises a first radial lip, which extends in a radially internal inward direction from a joining edge of the first radial lip joined to the elastomer seal, and with a second radial lip, which also extends in a radially internal inward direction from a joining edge of the second radial lip joined to the elastomer seal and axially more external than the first radial lip in relation to the double row of rolling bodies;
the first radial lip and the second radial lip each comprise a contacting edge configured to make sliding contact with a radially external surface of the radially inner ring; and
the first radial lip comprises a thickness (SP1) greater than a thickness (SP2) of the second radial lip;
wherein a radial component (L1) of a length of the first radial lip comprises a radial distance between a joining edge of the first radial lip joined to the elastomer seal and a radially inner and axially outer end of the contacting edge, and a radial component (L2) of a length of the second radial lip comprises a radial distance between a joining edge of the second radial lip joined to the elastomer seal and a radially inner and axially outer end of the contacting edge; and
the radial component (L1) of the length of the first radial lip and the radial component (L2) of the length of the second radial lip are a function of a diameter (ϕ) of a radially outer surface of the radially inner ring and an angular misalignment in the direction of the rotation axis (X) between the casing and the radially inner ring;
wherein a first angle (β) that each radial lip forms with the direction of the rotation axis (X) is between about 45° and about 75° and a second angle (α) that each contacting edge of the corresponding radial lips forms with the direction of the rotation axis (X) is between about 35° and about 65°.

* * * * *